United States Patent
Lin

[11] Patent Number: 6,053,525
[45] Date of Patent: Apr. 25, 2000

[54] FOLDABLE BABY STROLLER

[76] Inventor: Hui-Liang Lin, No. 408, Deng-Shan Rd., Hsi-Chou Hsiang, Chang-Hua Hsien, Taichung, Taiwan

[21] Appl. No.: 09/435,196

[22] Filed: Nov. 5, 1999

[51] Int. Cl.[7] ...................................................... B62B 7/08
[52] U.S. Cl. ........................... 280/642; 280/650; 280/62; 403/84; 403/102
[58] Field of Search ..................... 280/641, 642, 280/650, 647, 47.371, 62; 403/84, 102, 83, 101

[56] References Cited

U.S. PATENT DOCUMENTS

| | | | |
|---|---|---|---|
| 4,848,787 | 7/1989 | Kassai | 280/642 |
| 5,454,584 | 10/1995 | Kaut et al. | 280/642 |
| 5,460,398 | 10/1995 | Huang | 280/642 |
| 5,605,409 | 2/1997 | Haut et al. | 280/650 X |
| 5,622,376 | 4/1997 | Shamie | 280/642 |
| 5,683,096 | 11/1997 | Zonka | 280/62 X |
| 5,934,153 | 8/1999 | Yang | 280/642 X |

*Primary Examiner*—Michael Mar
*Attorney, Agent, or Firm*—Charles E. Baxley Exq.

[57] ABSTRACT

A foldable baby stroller includes a main frame composed of a first section and a second section which is connected with each other by two retaining members. Two connection members are respectively pivotally connected to the first section by two position pins and are respectively secured to the second section. A U-shaped rear frame has two separating tubes and which are respectively connected to the two sections of the main frame. The retaining members are detachably connected to the second section so that when folding the stroller, the first section is pivoted to overlap onto the second section by disconnecting the retaining members from the second section, and the first section disconnecting from the separating tubes.

6 Claims, 8 Drawing Sheets

FOLDABLE BABY STROLLER

FIELD OF THE INVENTION

The present invention relates to a baby stroller, and more particularly, to an improved baby stroller wherein the main frame can be folded into two overlapped sections when folded so as to become a compact size.

BACKGROUND OF THE INVENTION

Figure 8:
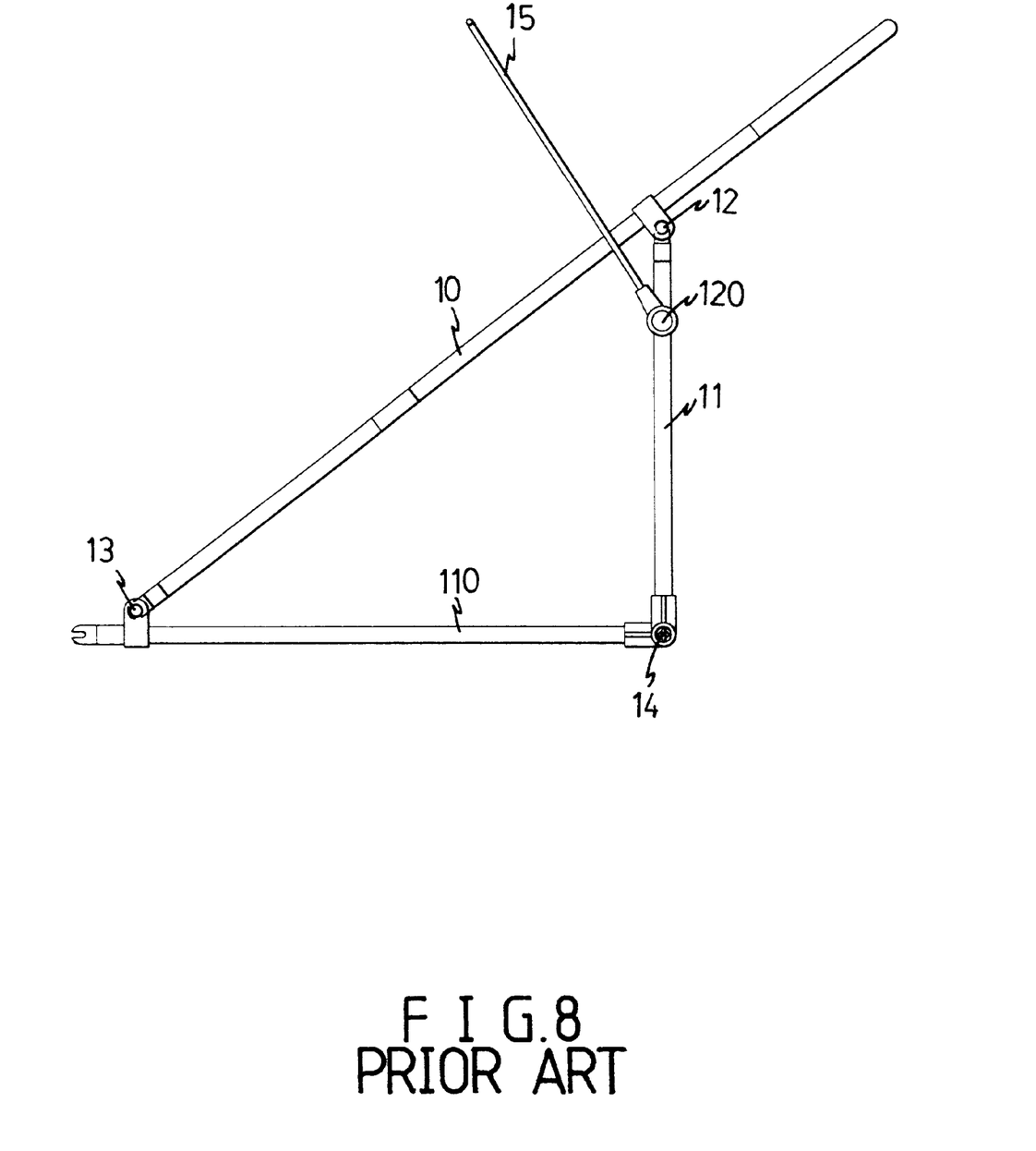
FIG. 8 is an illustrative view to show a frame of a conventional baby stroller.
Figure 9:
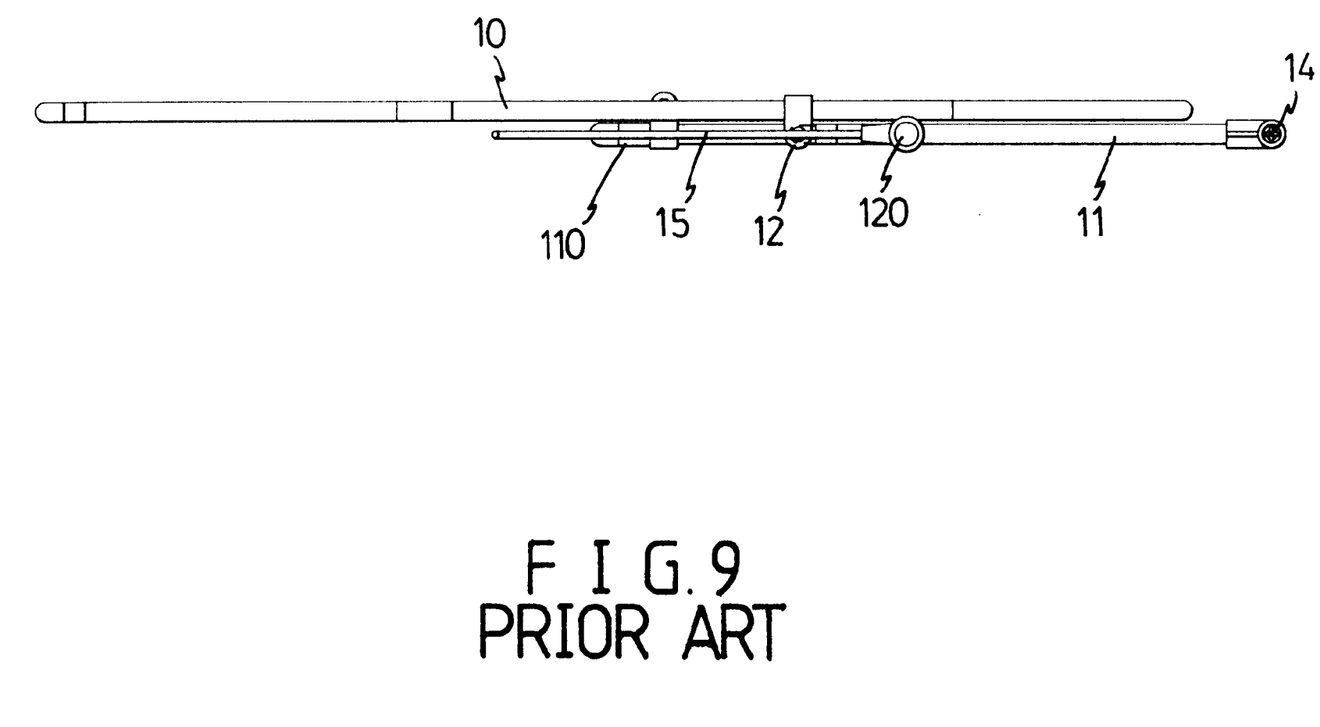
FIG. 9 shows the folded conventional baby stroller as shown in FIG. 8.

A conventional foldable baby stroller known to applicant is shown in FIGS. 8 and 9 and includes a U-shaped main frame 10 and an upright frame 11 and a horizontal frame 110 are respectively pivotally connected to the main frame 10 at an higher position and a lower position by pivotal means 12 and 13. The upright frame 11 and the horizontal frame 110 are connected by an axle 14. A hood frame 15 is pivotally mounted to two sides of the upright frame 11 by another pivotal means 120. When folding the baby stroller, a pin extending through the pivotal means 13 is pulled out and the main frame 10 is disconnected from the horizontal frame 110 which is then pivoted about the axle 14 to overlap with the upright frame 11. The upright frame 11 is pivoted to be in parallel with the main frame 10 so as to let the baby stroller occupy a less space. Nevertheless, the main frame 10 includes a handle portion so that the length of the main frame 10 is long and cannot be folded to be a shorter size. It is inconvenient for the user to receive the folded baby stroller in a small car.

The present invention intends to provide a foldable baby stroller that allows the user to fold the main frame into two overlapped sections so as to effectively shorten the size of the baby stroller.

SUMMARY OF THE INVENTION

In accordance with one aspect of the present invention, there is provided a foldable baby stroller comprising a main frame having a first section and a second section which is connected to the first section by two retaining members which are detachably connected to the section. A U-shaped rear frame is pivotally connected to the second section and two separating tubes pivotally extend from the U-shaped rear frame.

The first section has two first tubes each have a first end and a second end. Two connection members are respectively pivotally connected to the two first tubes at two respective first ends of the two first tubes. The two second ends of the two first tubes are detachably connected to the two separating tubes.

The second section has two second tubes and a handlebar is connected between the two second tubes. The two second tubes are connected to the two connection members. Two position pins respectively removably extend through the two connection members and the first tubes.

The object of the present invention is to provide a foldable baby stroller wherein the main frame of the stroller can be folded to be a half length of the main frame so that the folded baby stroller of the present invention occupies a very limited space.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Referring to FIGS. 1 to 4, the baby stroller in accordance with the present invention comprises a main frame 20 having a first section and a second section which is connected to the first section by two retaining members 50. A U-shaped rear frame 23 is pivotally connected to the second section and an axle for rear wheels (not shown) may extend through lower ends of the rear frame 23. Two separating tubes 230 pivotally extend from the U-shaped rear frame 23.

The first section includes two first tubes 201 each have a first end and a second end. Each first tube 201 has a head 2010 on the first end thereof so that the retaining member 50 is not disengaged from the first end of the first tube 201 after the first tube 201 extends through a hole 52 in the retaining member 50. Two connection members 30 each have two sidewalls and are respectively pivotally connected to the two first tubes 201 at two respective first ends of the two first tubes 201 by extending a pin 32 through the two sidewalls of the connection member 30 and the first tube 201. Two position pins 34 respectively removably extend through holes 33 defined in the sidewalls of the two connection members 30 and the first tubes 201. In order to prevent the position pins 34 from loosening, each position pin 34 is cooperated with a safety locking member 51. By the position pins 34, the first tubes 201 is secured to the connection members 30. The two second ends of the two first tubes 201 are detachably connected to the two separating tubes 230. Two pivotal members 22 are connected to the two separating tubes 230 and each pivotal member 22 has two sidewalls. The two first tubes 201 are detachably connected to the two pivotal members 22 by extending two connection pins 24 through holes 25 in the sidewalls of the pivotal members and the first tubes 201.

The second section has two second tubes 202 and a handlebar 21 is connected between the two second tubes 202. The two second tubes 202 detachably extend through a hole 53 in the two retaining members 50 and are fixedly connected to the sidewalls of the two connection members 30. A hood frame 40 is connected to the U-shaped rear frame 23.

Figure 1:
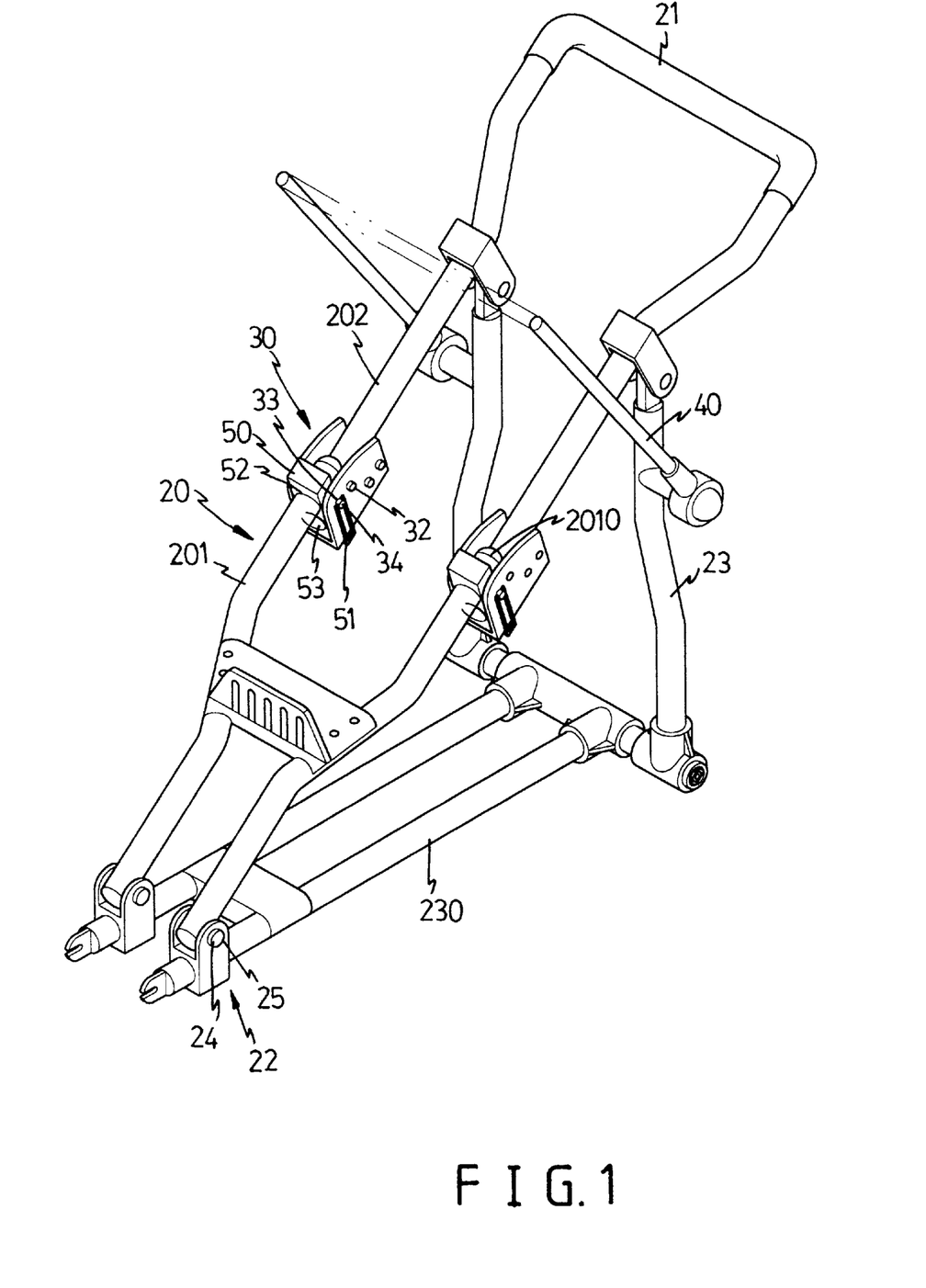
FIG. 1 is a perspective view of the frame of a baby stroller in accordance with the present invention.
Figure 2:
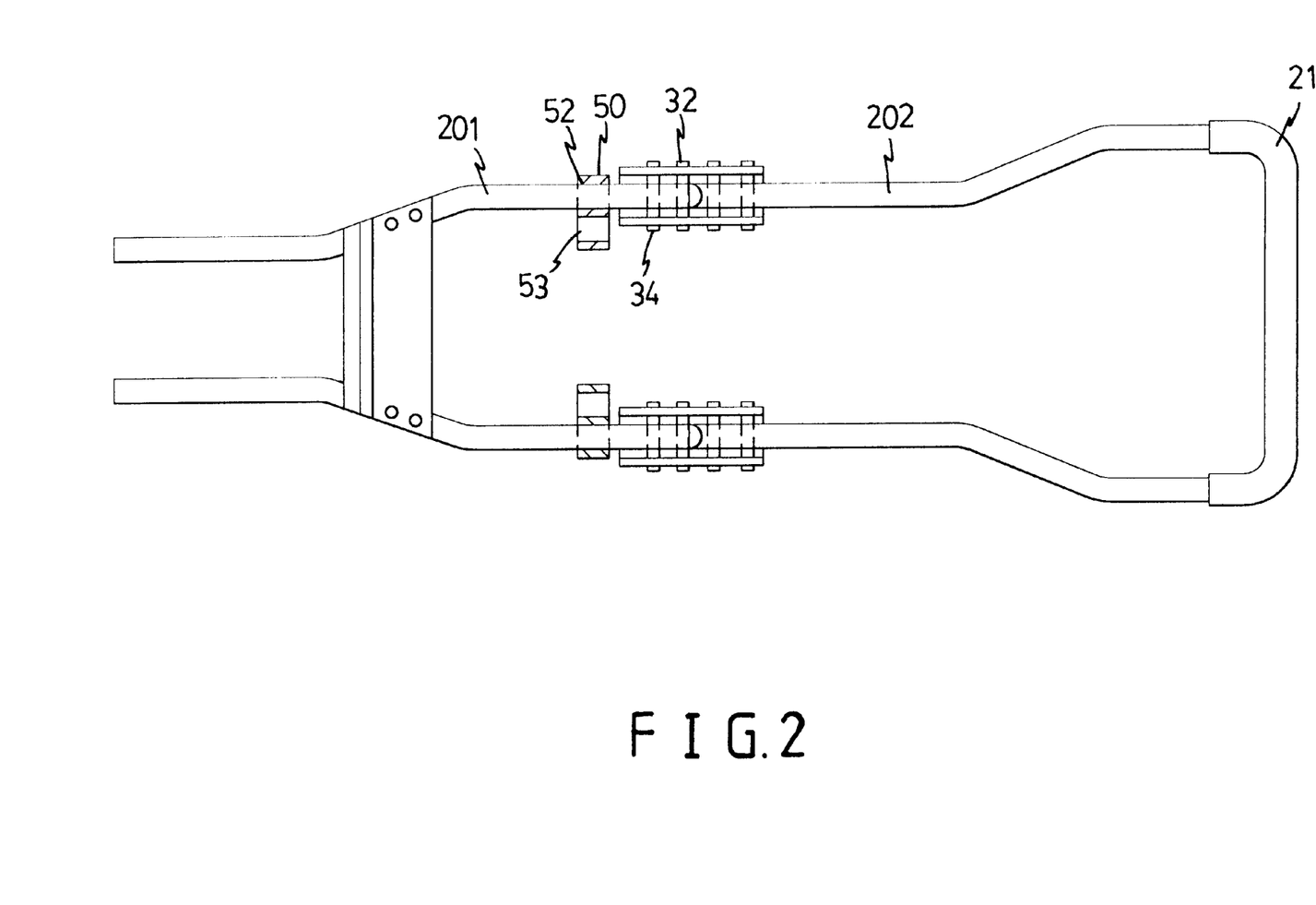
FIG. 2 is a top plan view to show the frame of the baby stroller of the present invention.
Figure 3:
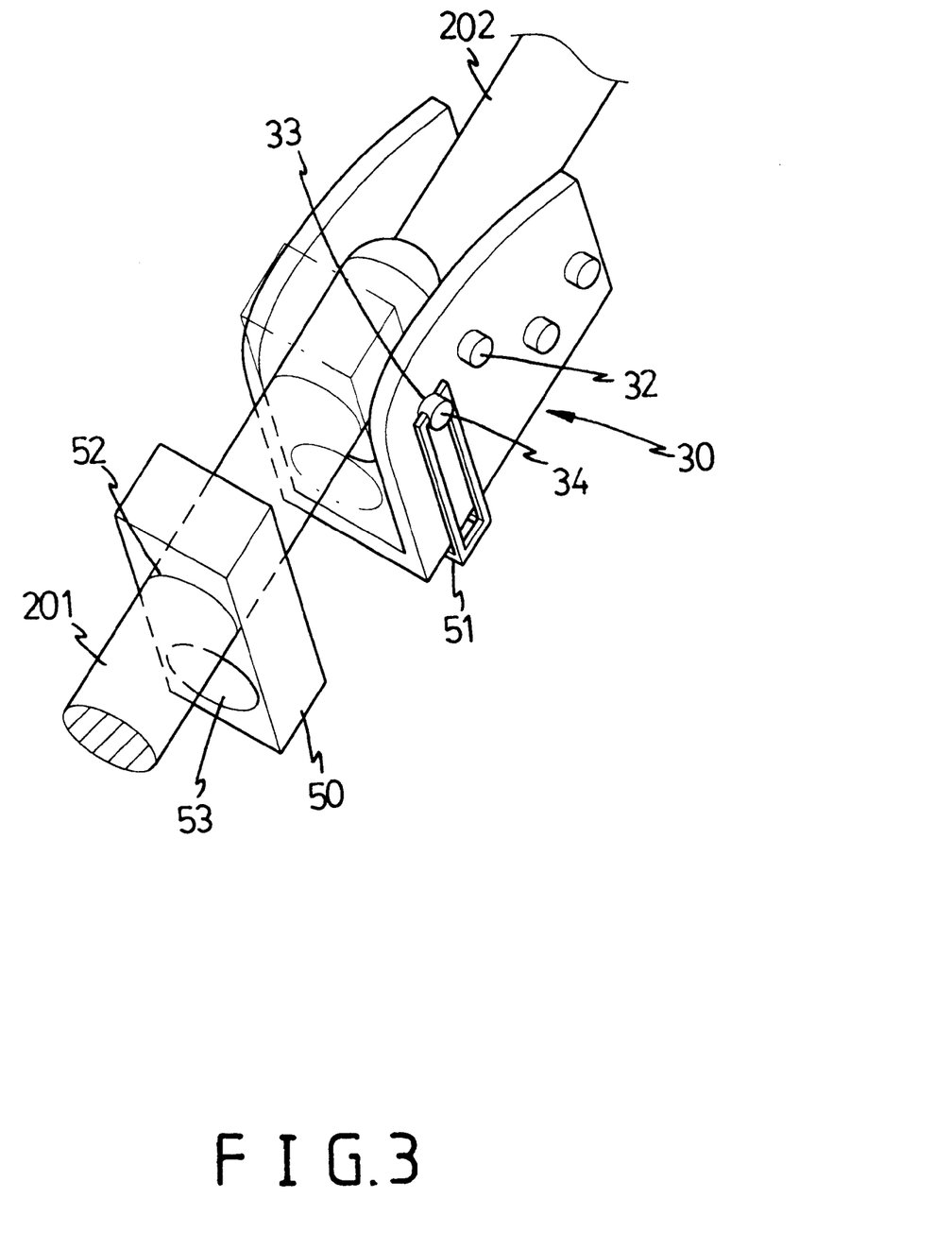
FIG. 3 is a perspective illustrative view to show the retaining member is detachably connected to the second section of the main frame of the baby stroller of the present invention.
Figure 4:
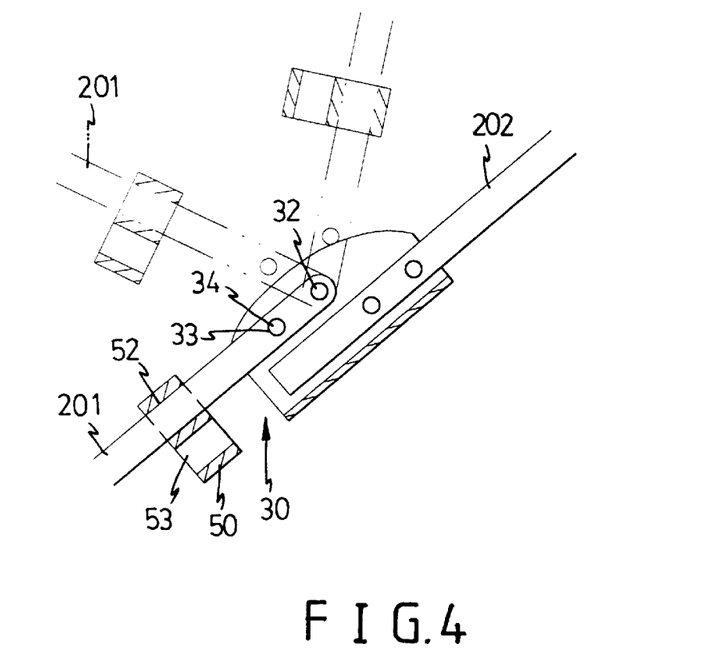
FIG. 4 is an illustrative view to show the first section is pivoted relative to the second section.
Figure 5:
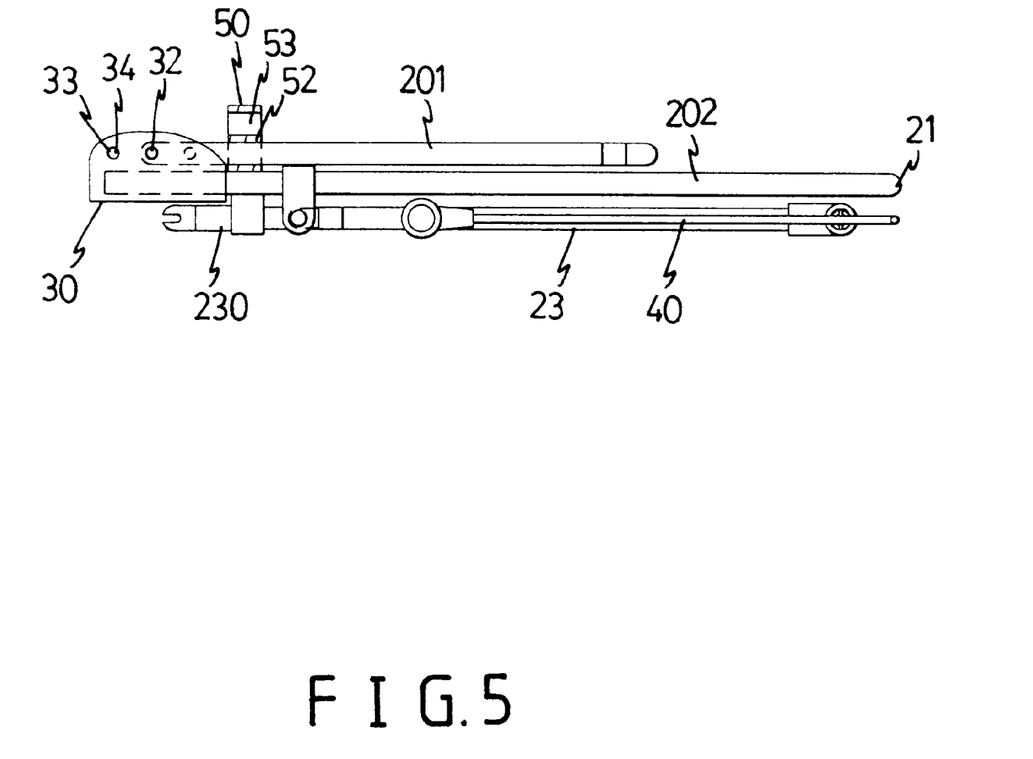
FIG. 5 is a side view to show the folded frame of the baby stroller of the present invention.
Figure 6:
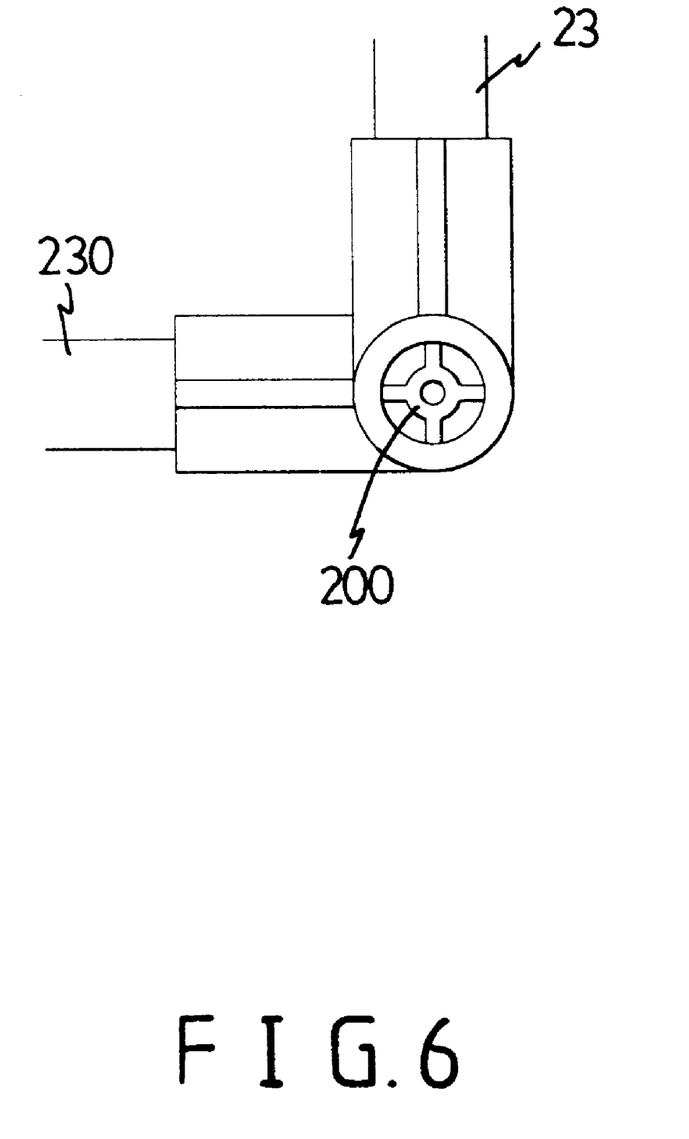
FIG. 6 is an illustrative view to show the tubes of the frame of the baby stroller of the present invention has a cruciform rib to enforce its strength.

Therefore, as shown in FIGS. 3 and 4, when folding the baby stroller, the connections pins 24 are removed to let the first two first tubes 201 detach from the two separating tubes 230, the position pins 34 are removed, and the retaining members 50 are pulled away from the handlebar 21 to disconnect the second tubes 202 and the retaining members 50. The two first tubes 201 are pivoted respectively about the pins 32 and overlap onto the second tubes 202. The rear frame 23 are pivoted relative to the two second tubes 202 so that the baby stroller is folded to be small size as shown in FIG. 5. It is to be noted that each tube in the frame of the baby stroller has a cruciform rib 200 which enforce the structural strength of the tubes.

Figure 7:
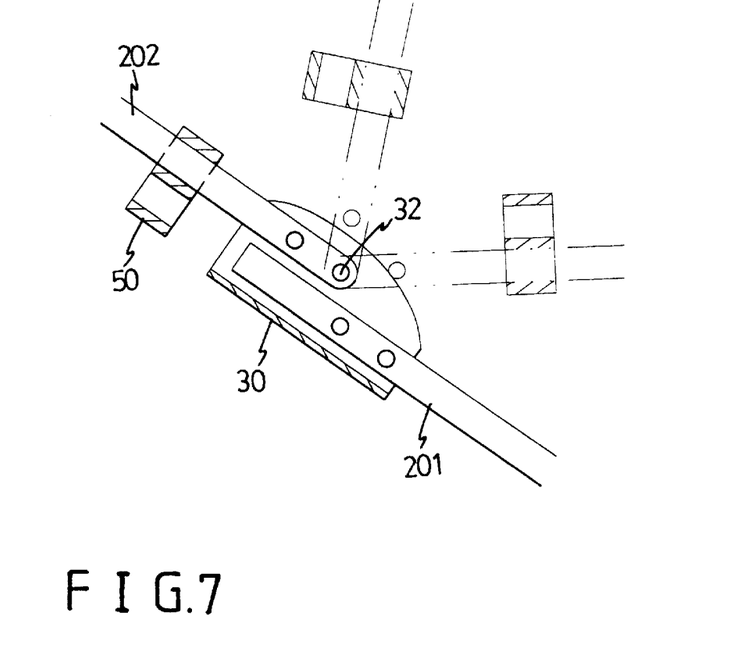
FIG. 7 shows that the first section is secured to the connection member and the second section is pivotably connected to the connection member.

FIG. 7 shows that the engagement between the connection members 30 and the first tubes 201 and the second tubes 202 can be mutually changed so that the retaining member 50 is detachable from the first tubes 201 and the second tubes 202 can be pivoted about the pins 32 to overlap onto the first tubes 201.

The main frame 20 of the baby stroller can be folded into two sections and this makes the total length of the folded baby stroller be only a half length of the main frame 20.

While we have shown and described various embodiments in accordance with the present invention, it should be clear to those skilled in the art that further embodiments may be made without departing from the scope and spirit of the present invention.

What is claimed is:

1. A foldable baby stroller comprising:

a main frame having a first section and a second section which is connected to said first section by two retaining members, a U-shaped rear frame pivotally connected to said second section and two separating tubes pivotally extending from said U-shaped rear frame;

said first section having two first tubes each having a first end and a second end, two connection members respectively pivotally connected to said two first tubes at two respective first ends of said two first tubes, said two second ends of said two first tubes detachably connected to said two separating tubes;

said second section having two second tubes and a handlebar connected between said two second tubes, said two second tubes detachably extending through said two retaining members and connected to said two connection members, and two position pins respectively removably extending through said two connection members and said first tubes wherein the two second ends of the two first tubes are detached from the two separating tubes, the two position pins are removed from the two connection members, and the retaining members are slidably pulled away from the two second tubes for permitting the stroller to be folded.

2. The baby stroller as claimed in claim 1 further comprising two pivotal members connected to said two separating tubes, said two first tubes detachably connected to said two pivotal members by extending two connection pins through said first tubes and said pivotal members.

3. The baby stroller as claimed in claim 2, wherein each pivotal member has two sidewalls and said second end of each first tube is retained between said two sidewalls of said pivotal member by said connection pin.

4. The baby stroller as claimed in claim 1, wherein each connection member has two sidewalls so that said first tube and said second tube are received between said two sidewalls of said connection member.

5. The baby stroller as claimed in claim 1, wherein each first tube has a head on said first end thereof so as to prevent said retaining member from disengaging from said first end of said first tube.

6. The baby stroller as claimed in claim 1 further comprising a hood frame connected to said U-shaped rear frame.

* * * * *